Aug. 21, 1923.
E. J. MORAN
1,465,611
METHOD OF AND APPARATUS FOR LAYING REENFORCING PLATES IN THE MANUFACTURE OF TIRE LINERS
Filed May 5, 1922
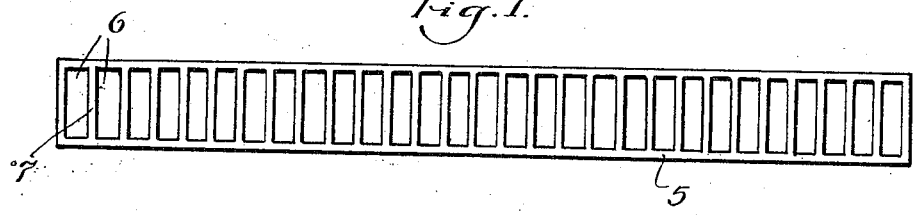
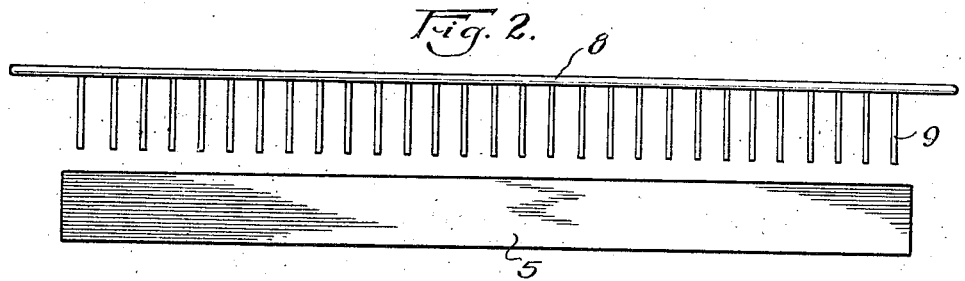
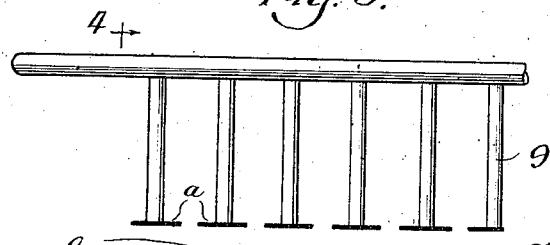 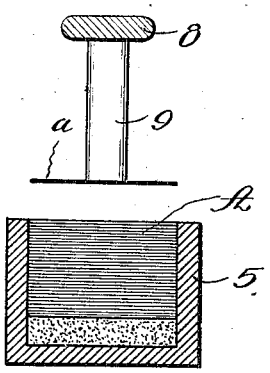
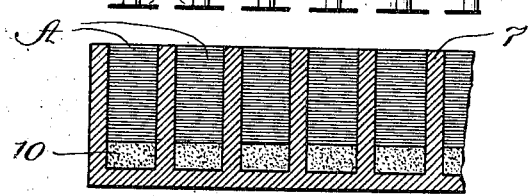
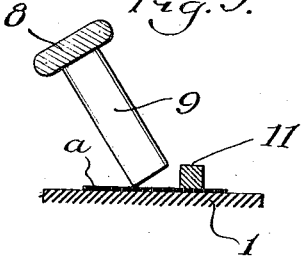 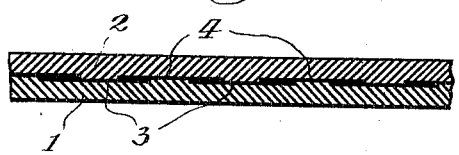
Inventor:
Edward J Moran,
By Wm F Treudenreich, Atty.

Patented Aug. 21, 1923.

1,465,611

UNITED STATES PATENT OFFICE.

EDWARD J. MORAN, OF CHICAGO, ILLINOIS.

METHOD OF AND APPARATUS FOR LAYING REENFORCING PLATES IN THE MANUFACTURE OF TIRE LINERS.

Application filed May 5, 1922. Serial No. 558,682.

*To all whom it may concern:*

Be it known that I, EDWARD J. MORAN, a citizen of the United States, residing at Chicago, county of Cook, State of Illinois, have invented a certain new and useful Improvement in Methods of and Apparatus for Laying Reenforcing Plates in the Manufacture of Tire Liners, and declare the following to be a full, clear, and exact description of the same, such as will enable others skilled in the art to which it pertains to make and use the same, reference being had to the accompanying drawings, which form a part of this specification.

There are several types of liners for automobile tires which serve to form an armor for an inner tube; each liner being in the form of a long rubber strip having imbedded therein thin metal plates arranged in a plurality of rows extending longitudinally of the strip, each row being made up of a large number of small plates arranged in a definite spaced relation to each other, and the plates of one row overlapping the plates of the adjacent row or rows. In the manufacture of these liners it is essential that the reinforcing plates be properly located but, because of the large number of such plates used in the manufacture of a single liner, it has heretofore been rather an expensive and tedious process properly to place the plates in position.

The object of the present invention is to produce a simple and novel method of and apparatus for quickly and accurately placing an entire row of plates in a liner by a single operation.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of the container for stacks of reinforcing plates;

Fig. 2 is a side elevation of the container together with the plate lifter ready to pick up a row of plates from the container;

Fig. 3 is a view on an enlarged scale, the container being shown in section, of a fragment of the container and of the lifter, just after the lifter has been raised with a row of plates adhering to the same;

Fig. 4 is a section taken approximately on line 4—4 of Fig. 3;

Fig. 5 is a vertical section taken through the lifter and the work during the process of laying down the plates on the work; and Fig. 6 is a section through a completed liner having the reinforcing plates imbedded therein.

Referring to Fig. 6, 1 and 2 represent the upper and lower layers of a tire liner. Between the two layers are two rows, 3 and 4, of overlapping metal reinforcing plates of any usual size or shape; the plates of the lower row 3 being first laid on the lower layer 1 in proper spaced relation to each other, and the plates of the other row being then laid upon the first row in staggered relation to the plates of the first row. Of course any desired number of rows of plates may be employed but, as my invention may be illustrated in its application to a liner having two rows of plates, I have selected this simple form for the purpose of explaining my invention.

In accordance with my invention I employ a container 5 whose length is as great as that of the liner to be manufactured or at least as great as the length of a row of reinforcing plates which the liner is adapted to contain. The container is divided into compartments 6 by transverse partitions 7 whose thickness is approximately equal to the spacing between the plates in the liner; each compartment being of approximately the same size and shape as one of the plates so as to permit it to receive a stack of such plates. It will therefore be seen that when the container is filled with stacks of the reinforcing plates the uppermost plates in the row of stacks will lie in precisely the same relation to each other as the plates in one row in the finished liner. Therefore, if the top plate is lifted from each of the stacks in such a way as not to disturb the positions of such top plates relatively to each other, there will be at hand a complete row of reinforcing plates ready to be set into the liner. The lifting of the uppermost plates from the stacks in the container and the transfer thereof to a liner in the course of manufacture can conveniently be effected by means of a lifter consisting of a long bar 8 having fingers 9 projecting from one side thereof and all lying in a single plane; the fingers being of uniform length and being so spaced that the distance between each pair of consecutive fingers is equal to the distance between the centers of consecutive compartments in the container. The free ends of the fingers are preferably made flat and, when the lifter is to be put into use, the ends of the fingers are covered with some cementitious substance, preferably a rubber cement. The lifter is then placed over the container so that each finger lies directly over the center of one of the stacks and, upon pressing down on the lifter the cementitious substance on the ends of the fingers will adhere to the top plates of the row of stacks and, when the lifter is raised, each finger will carry on its lower end one of the plates. Thus in Figs. 3 and 4 the stacks of plates are indicated at A while the individual plates are indicated at a. If desired, the bottom of each compartment in the container will be provided with a cushion, as indicated at 10, so as to compensate for any inequalities in the heights of the several stacks and insure that each finger will be firmly pressed against the top of the corresponding stack, even though the stacks are not all initially of exactly the same height.

The lifter, with its row of reinforcing plates attached thereto, is then set upon the bottom layer of a liner as illustrated in Fig. 5 and, on the ends of the plates which project beyond the fingers at one side of the latter, I lay or hold a bar 11 while the lifter is being tilted so as to carry the top thereof away from a vertical plane passing through the bar; thus permitting the fingers to tear themselves loose from the plates and leaving the plates resting on the rubber foundation in the form of a row in which the individual elements are arranged in proper spaced relation to each other. The lifter may then be used to pick up a second row which is deposited upon the first row in staggered relation to the latter, after which the top layer of the liner is applied.

It will thus be seen that I have provided a simple and novel method of and means for quickly and accurately forming and transferring any desired number of rows each containing a large number of plates in definite spaced relation to each other; so that the process of assembling the reinforcing plates in a tire liner becomes simple and inexpensive.

I claim:

1. An apparatus for laying reinforcing plates in definite spaced relation to each other in the manufacture of tire liners, which consists of a container having a row of compartments equal in number to the aforesaid plates and each of a size and shape to receive a stack of such plates, and a lifter having a row of parallel fingers of uniform length projecting from one side thereof, the fingers having the same spacing as that of the plates in the liner.

2. An apparatus for laying reinforcing plates in definite spaced relation to each other in the manufacture of tire liners, which consists of a container having a row of compartments equal in number to the aforesaid plates and each of a size and shape to receive a stack of such plates, and a lifter having a row of parallel fingers of uniform length projecting from one side thereof, the fingers having the same spacing as that of the plates in the liner, each compartment having a yielding cushion in the bottom thereof.

3. The method of forming and transferring to a liner rows of plates arranged in definite spaced relation to each other, which consists in forming a row of stacks of such plates, the stacks having said definite spaced relation to each other, causing the uppermost plate on each stack to adhere to a lifter, setting the lifter on the liner with the plates thereon in contact with the liner, and then stripping the plates from the lifter.

In testimony whereof, I sign this specification.

EDWARD J. MORAN.